Patented Sept. 24, 1940

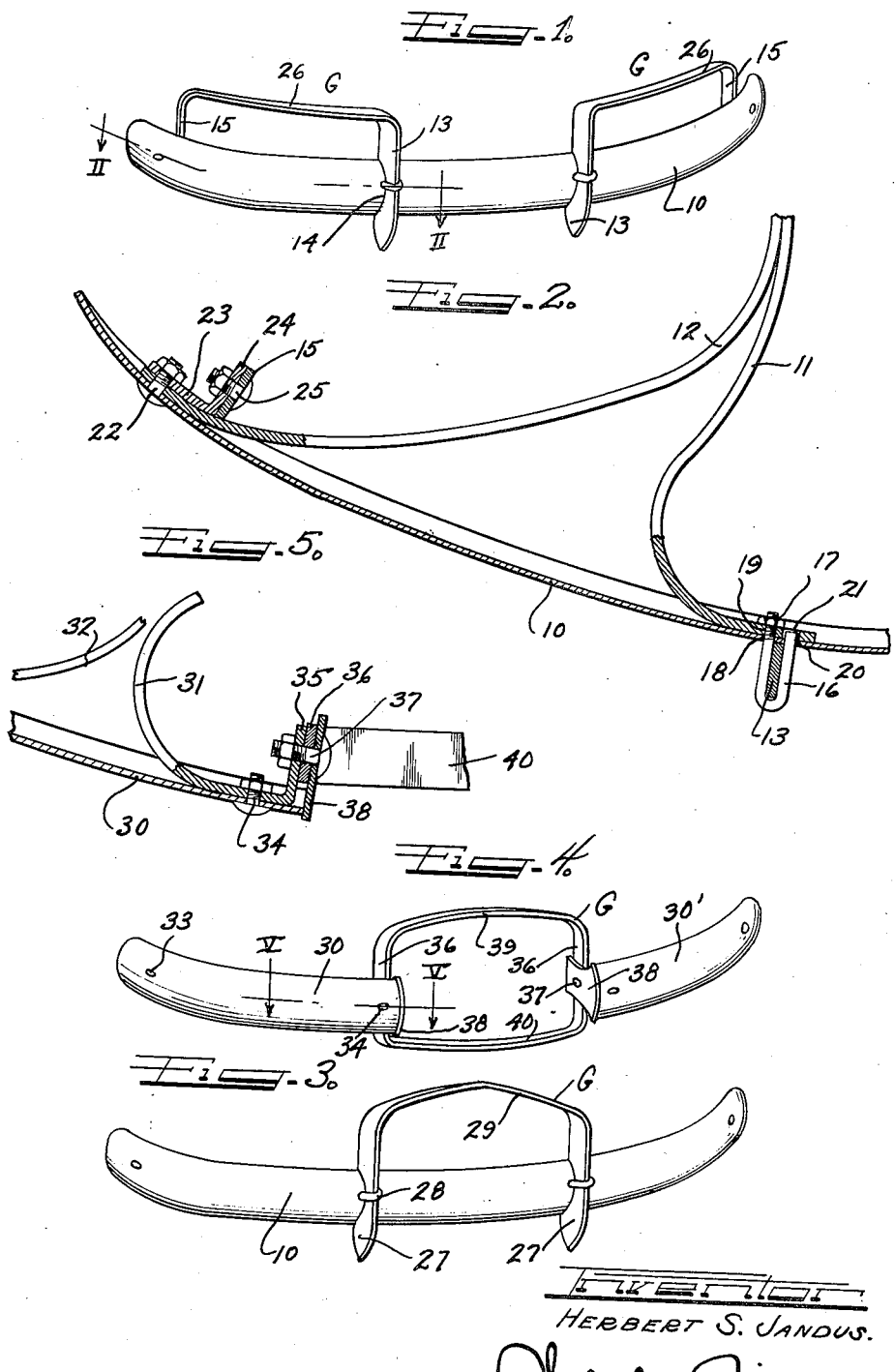

2,215,509

UNITED STATES PATENT OFFICE 2,215,509

BUMPER STRUCTURE

Herbert S. Jandus, Detroit, Mich., assignor to Houdaille-Hershey Corporation, Detroit, Mich., a corporation of Michigan Application March 31, 1939, Serial No. 265,094

2 Claims. (Cl. 293—55)

This invention relates to automobile bumper structure and particularly to bumper and guard assemblies.

An important object of the invention is to provide integral guard units detachably securable to a bumper impact bar and having portions extending transversely of the impact bar and other portions parallel with the bar either above or below the bar.

A further object is to provide improved means for securing the guard unit to the impact bar.

The various features of my invention are incorporated in the structure shown on the drawing, on which drawing:

Figure 1 is a perspective elevation showing the bumper impact bar with one form of guard unit mounted thereon;

Figure 2 is an enlarged section on line II—II of Figure 1;

Figure 3 is a view similar to Figure 1 showing a modified arrangement of a guard unit;

Figure 4 shows another modified arrangement in which a guard unit is interposed between impact bar portions; and Figure 5 is an enlarged section on line V—V of Figure 4.

Referring to Figures 1 and 2, 10 represents the impact bar of a bumper which is secured to the vehicle by pairs of inner and outer bars 11 and 12, each pair of bars being secured to and extending forwardly from the automobile chassis, the outer bar at its forward end deflecting gradually laterally to be secured to the impact bar, and the inner bar being bent along its forward end to parallel the impact bar and to be secured thereto.

In the arrangement of Figure 1, two guard unit structures G are provided, each unit being bent up from a length of stock bar to substantially inverted U shape, the inner leg 13 having the recess 14 in its rear edge shaped to intimately receive and fit the front of the impact bar which may be of curved cross section. The outer leg 15 of each guard unit is adapted to be secured to the impact bar.

Referring to Figure 2, common means are shown for securing the inner legs of the guard units and the forward ends of the inner supporting bars 11 to the impact bar. I have shown a U-shaped strap or bolt 16 as the securing means, one leg of the bolt being threaded for reception of a nut 17, the threaded end of the bolt extending through a hole 18 provided in the impact bar 10 and a hole 19 provided in the front end of the supporting bar 11, the unthreaded end of the bolt extending through a hole 20 in the impact bar and a hole 21 in the end of the supporting bar 11, so that when the nut 17 is tightened, the leg 13 of the guard unit will be rigidly clamped against the front of the impact bar, and the impact bar will be secured to the inner supporting bar 11, the engagement of the unthreaded end of the bolt in the hole 21 of the supporting bar assisting in securing the supporting bar and impact bar in alignment.

For securing the outer end of the outer supporting bar 12 and the outer end of the guard unit to the impact bar, a bolt 22 is shown. An L bracket 23 is provided between which and the impact bar the outer end of the supporting bar 12 is clamped. The outer leg 15 of the guard unit terminates adjacent to the rearwardly extending leg 24 of the L bracket and is secured thereto as by a bolt 25. Thus the guard units are detachably secured to the bumper structure so that they may be readily replaced in case of damage thereto. The yoke portions 26 of the guard units G will be a distance above the impact bar 10 and will assist the guard legs 13 and 15 in guarding against interlock of the bumper structure with bumpers on other cars.

In the arrangement of Figure 3, a single guard unit G is provided of which the vertical legs 27 may be secured to the impact bar 10 by hook bolts 28 in the same manner as shown in connection with Figures 1 and 2. The yoke portion 29 of the guard unit may parallel the impact bar or may be domed or gabled. When located along the middle portion of the impact bar, the guard structure will afford adequate protection for the radiator and grille structure of the automobile.

In the modified arrangement of Figures 4 and 5, a guard unit G is interposed between impact bar portions 30 and 30', each supported from the corresponding side of the adjacent chassis by a pair of inner and outer supporting bars 31 and 32 which may be like the supporting bars shown in Figure 2. Referring to Figure 5, the outer supporting bar 32 at its outer end will be secured to the outer end of the corresponding impact bar portion by means of a bolt 33 (Figure 4). The forward end of the inner supporting bar 31 will extend parallel a distance with the inner end of the corresponding impact portion 30 or 30' and will be secured to the impact bar portion by a bolt 34.

The guard structure G shown is rectangular and may be bent from a length of stock bar. The inner supporting bars 31 have their inner ends 35 deflected rearwardly for supporting the guard structure G. The guard structure is interposed between the supporting ends 35 of the supporting bars and the side legs 36 of the guard unit are secured to the supporting ends as by bolts 37. To further secure the guard structure and to afford a more finished appearance, plates 38 may be provided which are apertured to receive the bolts 37 between their heads and the sides 36 of the guard structure and to abut against the inner ends of the impact bar portions 30 and 30'. When the guard unit is thus secured, its upper and lower legs 39 and 40 will be respectively above and below the impact bar portions and with the sides 36 of the guard structure will afford ample protection for the radiator and grille against impact by bumper structures on other cars. The guard structure by being rigidly secured to the inner supporting bars 31, will rigidly secure together the inner ends of the impact bar portions to form a rigid impact structure therewith, and by having this gap between the impact bar portions 30 and 30' there will be materially less interference with the free flow of air through the radiator structure.

The various guard unit structures may be economically manufactured and secured for service and will add to the strength and rigidity of the impact bar structure.

I have shown practical and efficient embodiments of my invention, but I do not desire to be limited to the exact construction and arrangement shown and described, as changes and modifications are possible which would still come within the scope and spirit of the invention.

I claim as follows:

1. An automobile bumper assembly comprising an impact bar structure, two pairs of outer and inner supporting bars for said impact bar structure, the outer supporting bars of said pairs being secured at their outer ends to the outer ends respectively of said impact bar structure, the outer portion of the inner supporting bars of said pairs extending a distance laterally inwardly parallel with the impact bar and being secured to the impact bar structure at spaced apart intermediate points thereof, the ends of said outer portions being deflected rearwardly at substantially right angles with the impact bar to form supporting brackets, a guard structure between said brackets comprising a horizontally extending portion above the impact bar structure and depending leg portions engaging with said brackets, and securing means securing said depending leg portions to said brackets.

2. An automobile bumper assembly comprising impact bar portions spaced apart at their inner ends, a pair of outer and inner rearwardly extending supporting bars for each impact bar portion, the outer supporting bars of the pair being secured at their ends to the outer ends of the corresponding impact bar portions, the outer portions of the inner bars of the pairs being parallel with and secured to the inner ends of said impact bar portions, the ends of said outer portions being deflected rearwardly at substantially right angles with the impact bar portions to form brackets, a guard structure between said brackets comprising a horizontal portion above the impact bar portions and depending leg portions engaging said brackets, cover plates covering the ends of said impact bar portions and said depending leg portions of the guard structure, and securing means securing said end plates and said depending leg portions to the respective brackets.

HERBERT S. JANDUS.